United States Patent [19]

Kuo et al.

[11] Patent Number: 5,047,926
[45] Date of Patent: Sep. 10, 1991

[54] DEVELOPMENT AND DEBUG TOOL FOR MICROCOMPUTERS

[75] Inventors: Ruey-Shen Kuo, PanChiao; Chun-Lin G. Chen; Ray-Yuan R. Lan, both of Taipei, all of Taiwan

[73] Assignee: Acer Incorporated, Taipei, Taiwan

[21] Appl. No.: 324,269

[22] Filed: Mar. 15, 1989

[51] Int. Cl.⁵ ............................................. G06F 11/00
[52] U.S. Cl. ............................. 364/200; 364/267.91; 364/240.2; 364/238
[58] Field of Search ......................... 364/200 MS File; 371/15.1

[56] References Cited

U.S. PATENT DOCUMENTS

| | | |
|---|---|---|
| 4,275,441 | 6/1981 | Takeuchi ............................ 364/200 |
| 4,308,581 | 12/1981 | Raghunathan ...................... 364/200 |
| 4,312,066 | 1/1982 | Bantz et al. ........................ 364/200 |
| 4,517,661 | 5/1985 | Graf et al. ..................... 371/15.1 X |
| 4,636,945 | 1/1987 | Tanagawa et al. ................. 364/200 |
| 4,703,482 | 10/1987 | Auger et al. ......................... 364/200 |

Primary Examiner—Thomas M. Heckler
Attorney, Agent, or Firm—Townsend & Townsend

[57] ABSTRACT

A debug interface for use in debugging a microprocessor during development. The debug interface is connected with a host computer for the bidirectional data transmissions and utilizes a ROM socket on the object system to communicate with the object system being debugged. The object system can read data from the debug interface only, but cannot write data thereto. The testing software program in the host computer is entered into an SRAM on the debug interface through a host computer data bus. When the content of the registers in the object system is required by the software, the data needed are dumped onto the object system address bus by software techniques; then through an input port, connecting the object system address bus to the host computer data bus, the data can be received by the host computer, and so displayed on the monitor of the host computer.

9 Claims, 2 Drawing Sheets

DEVELOPMENT AND DEBUG TOOL FOR MICROCOMPUTERS

BACKGROUND OF THE INVENTION

The present invention relates to debugging and testing equipment for use in the development of microcomputers.

In developing a modern microcomputer a prototype motherboard is first constructed, which must then be debugged through the use of the specialized microcomputer debug tools. In so doing, error related to the electronic circuit elements and/or the system will be detected and corrected early, before substantial costs are incurred.

The most extensively used microcomputer debug tool is known as an In-Circuit Emulator—ICE. This type of debug tool has a CPU which is the same as the CPU used on the prototype motherboard to be debugged, as well as other elements and circuits. In the testing arrangement, the ICE is connected with the microcomputer motherboard through one buffer and with a host testing computer through another buffer. During the testing procedure, the CPU of the ICE simulates the operation of the CPU on the motherboard and processes all the testing steps.

During the simulation testing procedures, the timing of the system clock signals is delayed and signal quality is affected because of the presence of the buffers and the influence of the data transmissions. Unfortunately this prevents the actual working speed from being simulated. In the infancy of microcomputer development, when speeds were slow and only a few microprocessors were available, the influence of the delayed system timing caused by the ICE did not constitute a significant difference when compared with the system timing in a real-time environment. However, at the present time, more microcomputer systems employ high system speeds, for example 12 megaHertz (mHz), 16 mHz, or even beyond 20 mHz. In addition, many different microprocessors have their own bus and control status. If an ICE is used for the debug tool, then an ICE must be chosen which corresponds closely to the CPU and speed which the motherboard employs. Unfortunately, because of the timing delays, there will be a significant difference between the simulated environment and the real-time ennvironment when the motherboard employs a higher system speed. Due to this difference the real-time working status, when the motherboard is running at very high system speed, will differ at least partially from the simulated testing status, when the motherboard is running under the debug environment using the ICE. These are the main drawbacks of the In-Circuit Emulator, which, additionally, has a highly complicated design.

SUMMARY OF THE INVENTION

The present invention provides a microcomputer development and debug system, sometimes referred to herein as a debug interface, which employs a simple method and simple circuit element arrangement to achieve similar functions to the ICE. The delay of the object system timing signals in a testing environment using the invention is minimized. Bugs which only appear when the motherboard is running at high system speed are thus detectable when the invention is used for the debug and development tool. The invention also can be used as a universal debug tool for different kinds of microprocessors and different system speed environments. Additionally, the invention provides a microcomputer debug tool by which the testing environment of the motherboard reflects the real time environment of the object system. The invention finds primary application as a debug tool for microcomputer development, and it is especially useful for applications requiring a real-time debugging environment.

In operation, a debug interface according to the invention is connected with a host computer with which data transfers are made bidirectionally. The host computer is then able to perform memory read and write operations from and to the debug interface as well as the input/output read operations. The motherboard object system being debugged sends the address of desired data to the debug interface through a read only Memory ("ROM") socket on the motherboard, which acts as a window and receives the addressed data from the debug interface through the same window. Accordingly, the data in the debug interface appear in the form of random-access memory ("RAM") to the host computer, but appear in the form of a ROM to the object system being debugged. The debug interface includes a Static Random Access Memory ("SRAM") connected with the host computer by means of a host computer data bus under the control of a bidirectional buffer. In this manner, the software instructions are sent from the host computer to the SRAM of the debug interface for execution by a processing unit of object system 3.

The software program is loaded into the host computer, and, through the invention as an interface, the debugging and control operations can be performed as needed. The testing and monitoring operations include: the object system Memory Test, Memory Read, Memory Write, Port Read, Port Write, Load, SAVE, Asm, Go, Disasm, Move, Fill, Break, or Break Point setting; and the content of the registers of the object system can also be sent to the host computer depending on the function of the software program.

When the content of an object system register is needed, the content of the register is dumped onto the object system address bus using software techniques. The host computer then sends an I/O port address to a decoder, which sends an input enable signal to an I/O port. This I/O port is connected with the object system address bus so that the data on the address bus will be transferred onto the data bus of the host computer and displayed on the monitor of the host computer for further inspection.

There are two embodiments by which the host computer reads and writes from and to the SRAM of the invention. According to the first embodiment, the host computer performs its access operations, after the object system enters a wait state; only after the access action is completed does the SRAM return to the control of the object system. It only takes several hundred nanoseconds for the host computer to read/write to the SRAM of the interface. Accordingly, a debugging environment utilizing this embodiment of the invention will not severely affect the normal operation of the object system; that is to say, the object system timing will not be seriously delayed, and the timing difference will not generally be significant when compared with the real-time environment of the object system.

According to the second embodiment, the object system does not enter a wait state, and the SRAM of the interface is always under the control of the object system. When the host computer is reading or writing to the SRAM, however, the invention provides a back-up SRAM for the object system, and the read/write instructions of the host computer do not affect the status of the object system. The invention copies the most updated version of the content of the SRAM to the back-up SRAM and does not affect the real-time execution status of the object system.

Errors which only occur in the real-time environment of the object system will be detected and corrected immediately using a debug tool according to the invention.

Using the invention as a debug tool for microcomputer development, the status of the object system in the debugging environment will be the closest to that in the real-time environment.

A better understanding of the nature and further advantages of the invention will be gained by reference to the following portions of the specification and the drawings.

DETAILED DESCRIPTION OF THE PREFERRED EMBODIMENTS

Figure 1:
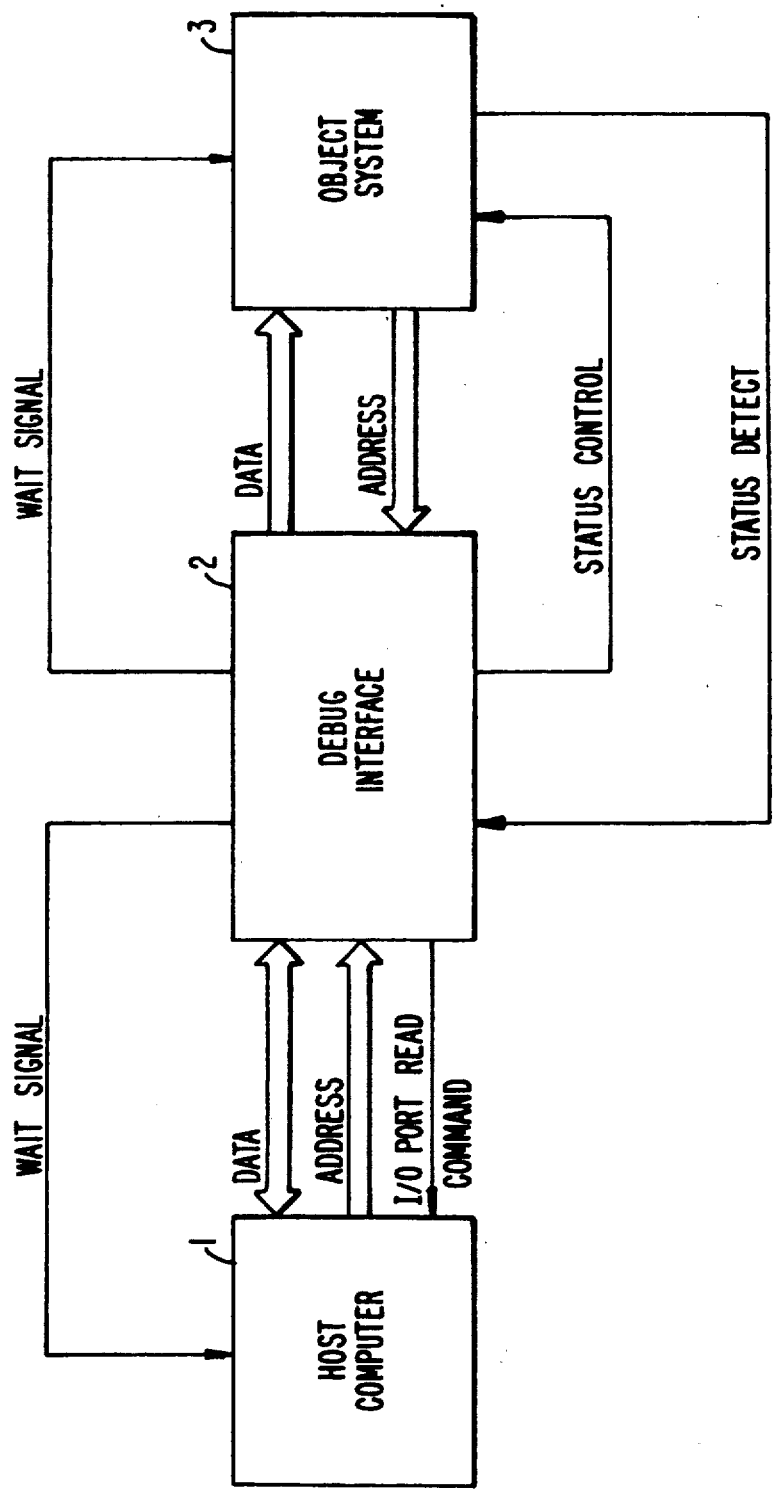
FIG. 1 is an overall block diagram of a system according to the invention.

Referring to FIG. 1, a debug interface 2 according to the present invention is connected with host computer 1 by host computer data and address buses such that the data are transferred bidirectionally. By means of the bidirectional bus connection the host computer 1 is able to read the I/O port on the object system through the debug interface 2. Furthermore, the object system 3 under test transmits the address of desired data of the debug interface 2, and reads the data from the SRAM 5 of the debug interface 2. Through the arrangement of bidirectional and unidirectional buses, as illustrated in FIG. 2, to host computer 1, the SRAM 5 behaves like a RAM, but to the object system 3 it behaves like a ROM.

Before applying the testing procedure to the object system 3, the ROM chip on the object system 3 must first be removed. Then, a different ROM socket 31, which has the necessary wiring for connection to the debug interface, is inserted into the original ROM socket on the object system 3. This ROM socket 31 serves as a window through which the object system 3 is connected to the debug interface.

The built-in software debugging program in the ROM which has been removed must be prepared beforehand and sent to the SRAM 5 on the debug unit through the host computer 1 for execution to monitor and control the object system 3. The testing and control operations may include Move, Fill, Break, Break Point setting, and operations such as sending the content of the registers of the object system 3 back to the host computer 1.

Figure 2:
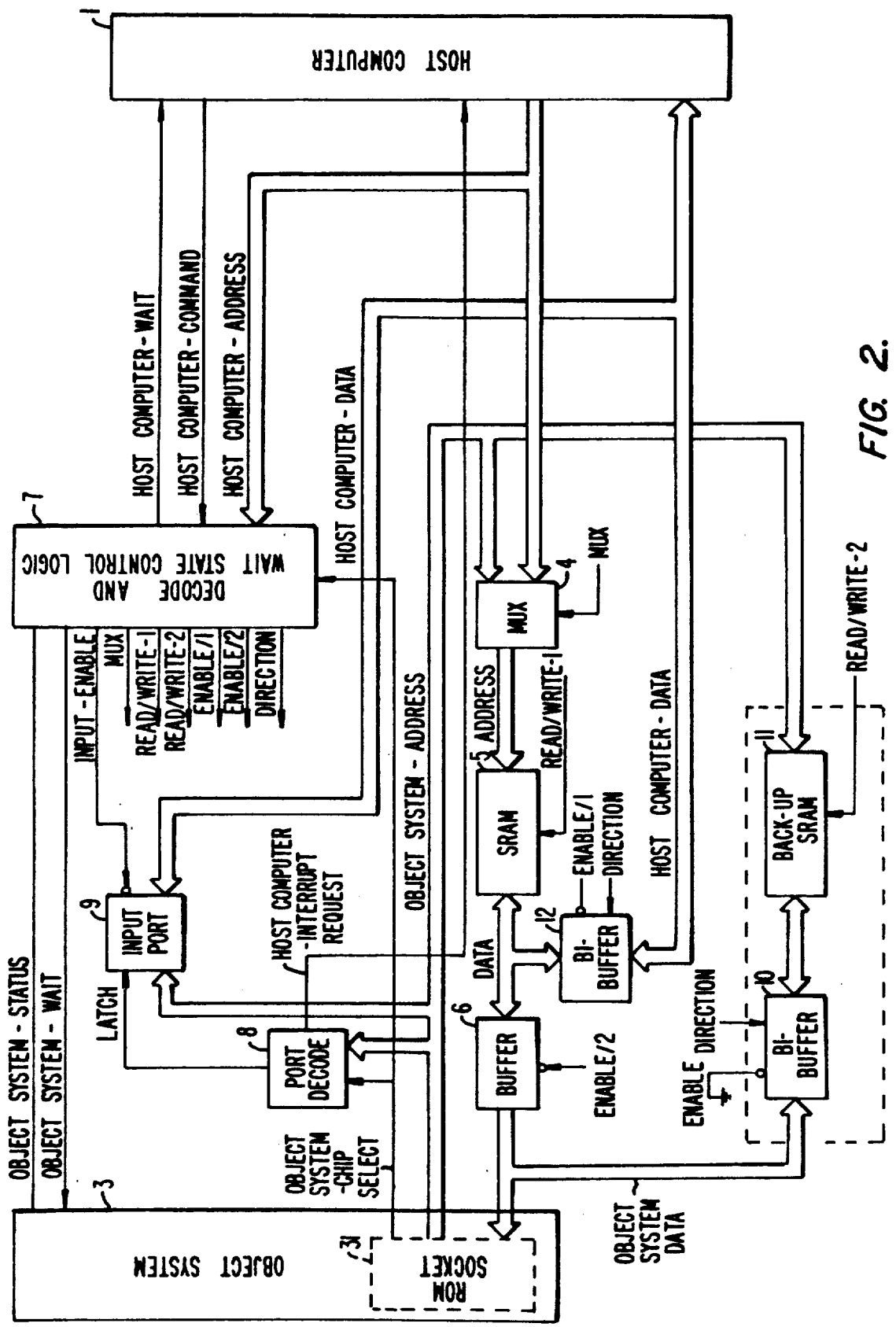
FIG. 2 is a detailed block diagram of an embodiment of a debug tool according to the invention showing the host computer, the object system under test, and two alternative configurations of the interface provided by the invention.

Referring to FIG. 2, the debug interface comprises decoder/wait state control logic 7, SRAM 5, back-up SRAM 11, input port 9, port decoder unit 8, multiplexer 4, and various buffers. The decoder/wait state control logic 7 receives host computer commands and transmits the host computer wait signal to the host computer 1; it also receives object system status signals and transmits the object system wait signal to the object system 3.

The decoder/wait state control logic 7 and multiplexer 4 are the sinks of the host computer address bus. The host computer 1 is connected with input port 9 and with bidirectional buffer 12 through the host computer data bus.

The object system chip select signal is provided from the object system to the port decoder unit 8 and decoder/wait state control logic 7 through ROM socket 31. Port decoder unit 8, input port 9, multiplexer 4, and back-up SRAM 11 all receive the object system address bus. The buffer 6 is connected with the ROM socket 31 of the object system 3 and with the bidirectional buffer 10 through the object system data bus.

The SRAM 5, bidirectional buffer 12, and buffer 6 are connected to one another through a data bus. There is also a data bus between SRAM 11 and bidirectional buffer 10.

After the decoder/wait state control logic 7 receives the input signals, it sends out input-enable, MUX, read/write-1, read/write-2, enable/1, enable/2, and directional signals respectively to control the input port 9, multiplexer 4, SRAM 5, bidirectional buffer 12, back-up SRAM 11, bidirectional buffer 10, and buffer 6, as shown in FIG. 2.

After the chip-select signal has been provided to the port decoder unit 8, the decoder unit sends a latch enable signal to control the input port 9, and sends a host computer interrupt request signal to the host computer 1.

After the test program has been entered into the host computer 1, the host computer sends a command to decoder/wait state control logic 7 at the same time as the test program is put on the host computer data bus. Thereafter, the decoder/wait state control logic 7 sends out the enable/1 and direction control signals to enable the bidirectional buffer 12, which then passes the software program onto the data bus servicing the SRAM 5 and to the SRAM 5 for execution by a processing unit of object system 3.

Whenever the object system 3 is attempting to read the contents of the SRAM on the debug interface 2, it communicates with the debug interface using the object system chip select, address and data bus signals. When the CPU of the object system 3 wants to read the BIOS program of the removed ROM, the CPU sends the object system chip select signal and object system address signal to the legs of the ROM socket 31, and the above signals are then sent to the debug interface through the ROM socket 31 as a window. For simulating the reading step from thhe ROM BIOS of the object system, the object system chip select signal enters decoder/wait state control logic 7, which sends out a MUX signal to multiplexer 4 and a read/write-1 signal to SRAM 5. Thereafter the object system address signal is sent to the SRAM 5 through multiplexer 4, and the data in the SRAM 5 are sent to the object system 3 through the buffer 6.

When the host computer wants to read/write to the SRAM 5, it sends out a host computer address signal to the decoder/wait state control logic 7 for decoding, and it sends a MUX signal to multiplexer 4. Thereafter the decoder/wait state control logic 7 sends out the host computer-wait signal to host computer 1, causing the host computer 1 to enter the wait state. At that moment the debug interface inspects the objects system status signal sent to the decoder/wait state control logic 7 by the object system to determine the timing of the next object system cycle. As the object system starts the next cycle, the decoder/wait state control logic 7 sends out the object system-wait signal to the object system 3 causing it to enter the wait state. In the meantime, the host computer address signal sent by the host computer is transmitted to the SRAM 5 through the multiplexer 4, and the decoder/wait state control logic 7 also sends a read/write-1 signal to the SRAM 5 to specify the read/write action. The data bus serving the SRAM 5 is connected with the host computer data bus through the bidirectional buffer 12 for the read/write activity. Afterwards, the decoder/wait state control logic 7 terminates its host computer wait signal so that the host computer may complete the reading/writing cycle of the SRAM 5. Then, the decoder/wait state control logic 7 terminates its object system wait signal, thereby allowing the object system 3 to continue with its incomplete cycles.

When the CPU of the object system 3 is attempting to send the execution results to the host computer 1, it again uses the ROM socket 31 as a window. The object system first puts the data of the registers onto the object system address bus and sends out an object system chip-select signal. The port decoder unit 8 decodes the data in the higher byte address bus and sends a latch signal to the input port 9. The input port then latches the data in the lower byte address bus, which is just the message containing the execution results. At the same moment, port decoder unit 8 sends a host computer interrupt request signal to the host computer informing the host computer to access this information. After receiving the interrupt request signal, the CPU of the host computer sends a host computer I/O port address signal to the decoder/wait state control logic 7 for decoding. Thereafter the decoder/wait state control logic 7 sends an input-enable signal to input port 9. This allows the data on the object system address bus to enter the data bus of the host computer, and of course the data is then able to be displayed on the monitor of the host computer 1.

Through the internal activities described above, the host computer 1 can read and write data from and to the ROM socket 31 of the object system 3 for purposes of monitoring and control. And the object system 3 and be operated without a significant influence by the debug interface 2.

The aforesaid embodiment of the invention nevertheless has a minor effect on the timing of the object system. For, example, there will be a 200 to 500 nanosecond wait state interrupt every time the host computer 1 reads or writes from or to the SRAM 5, which will have some effect on the timing of the object system 3.

The second embodiment of the invention substantially eliminates even this minor effect, which the debugging tool can have on the timing of the object system 3. This embodiment includes a back-up SRAM 11 and bidirectional buffer 10 shown in the broken-line block of FIG. 2.

When the object system 3 attempts to read the SRAM 5, the address is sent to the SRAM 5 through the multiplexer 4 and the back-up SRAM 11. The data are sent back to the object system 3 by the uni-directional buffer 6. At this time the bidirectional buffer 10 is enabled and its direction is set from left to right; the bidirectional buffer 12 is closed by the enable/1 high level signal; and the back-up SRAM 11 is set into Written-In status by read/write-2 low level signal. Thus, any data at the address of the SRAM 5 being read will be copied into the same location in the back-up SRAM 11.

When the host computer 1 attempts to read or write from or to the SRAM 5, it sends the address to the decoder/wait state control logic 7, which inspects the received object system chip-select signal to determine the interval during which the SRAM 5 is not in communication with the object system 3. During this interval, the decoder/wait state control logic 7 sends an enable/2 high level signal to buffer 6 to close the buffer. It also sends out a directional signal to set the bidirectional buffer 10 from right to left and an enable/1 signal to open bidirectional buffer 12. In addition, it sends out a read/write-2 high level signal to set the back-up SRAM 11 into Read-Out Status. The decoder/wait state control logic also uses the MUX signal to control the multiplexer 4 so as to send the host computer address signal to the SRAM 5, and it reads/writes the SRAM 5 through the bidirectional buffer 12. If the object system 3 wants to read data from the SRAM 5 at the moment the SRAM 5 is being used by the host computer 1, the desired data will be sent to the object system 3 by the back-up SRAM 11 through bidirectional buffer 10 as the address is received by back-up SRAM 11. After the host computer 1 reads/writes the SRAM 5, the decoder/wait state control logic 7 determines the interval, during which the object system 3 is not using the SRAM 5, and uses this internal to set a read/write-2 low level signal. Also during this interval, it sends out a directional signal to set bidirectional buffer 10 from left to right, sends an enable/2 low level signal and an enable/1 high level signal to open the buffer 6 and to close the bidirectional buffer 12, and sends out a read/write-1 read signal to set the SRAM 5 to the Read-Out status. When the object system 63 reads the SRAM 5 the next time, the debug interface copies the accessed data to the same location in the back-up SRAM 11 at the same time as the object system 3 reads updated data the SRAM 5.

The second embodiment of the invention has no effect on the timing of the real-time environment of the object system 3, and the host computer can monitor and update the data of the SRAM 5 so as to accomplish the dual goals of control and debugging.

While the above provides a full disclosure of preferred embodiments of the invention, various modifications and equivalents will occur to those skilled in the art given the benefit of this disclosure. Accordingly, the invention is not intended to be limited only to the specific examples and embodiments disclosed herein, but is defined by the appended claims.

What is claimed is:

1. Apparatus for debugging an object system, said object system having at least a processing unit and a register, said object system having a ROM socket and providing a chip select signal, an object system address bus, and an object system data bus through said ROM socket, and said apparatus being connected to a host computer for bidirectional data transmission through a host computer data bus when addressed by a host computer address bus, said host computer including a debugging program for debugging said object system, and said apparatus being connected to said object system through said ROM socket, comprising:

decoder/wait state control logic means connecting with said host computer to receive address information therefrom, said control logic means being responsive to a plurality of command signals from said host computer and providing a wait signal to said host computer, said control logic means further connecting with said object system to receive said chip select signal and a status signal from said object system and providing a wait signal to said object system, said control logic means further providing an input-enable, a MUX, a read/write-1, an enable/1, an enable/2, and a direction signal;

an object system bus connecting with said object system at said ROM socket, said object system bus including said object system data and address bus;

multiplexer means connecting with said host computer to receive said host computer address information and connected to said object system address bus, said multiplexer means being responsive to said mux signal for providing an address signal derived from one of said host computer address information and information carried by said object system address bus;

port decoder means receiving said object system address bus and responsive to said chip select signal, and providing a host computer interrupt request signal to the host computer and a latch signal;

a host computer bus connecting with said host computer said host computer bus including said host computer data bus and address bus;

input port means connected to receive said object system address bus and said host computer data bus and being responsive to said latch signal and said input-enable signal for transferring data on said object system address bus to said host computer data bus;

SRAM means connected to receive said debugging program and at least a control instruction sent from the host computer through the host computer data bus, said SRAM being addressed by the address signal from the multiplexer means in response to said read/write-1 signal from said control logic means; and first bidirectional buffer means, second buffer means, and a data bus means interconnecting said SRAM means, first bidirectional buffer means, and second buffer means, wherein:
  said first bidirectional buffer means is connected to said host computer data bus and is responsive to said direction and enable/1 signals to enable data flow to and from said host computer;
  said second buffer means is connected to said object system data bus and is responsive to said enable/2 signal to enable communication to said object system; and
  the processing unit of the object system executing the debugging program and control instructions stored in the SRAM.

2. Apparatus in accordance with claim 1, wherein said decoder/wait state control logic means further provides a read/write-2 signal and said apparatus further comprises:
  third, bidirectional buffer means connected to said second buffer means over said object system data bus; and
  back-up SRAM means, said back-up SRAM means being addressed by the object system address bus and connected to said object system data bus through said third bidirectional buffer means for storing the data of said SRAM read by the object system in response to the read/write-2 signal and the direction signal; and whereby when the object system desires to read the data of the SRAM during the time interval the SRAM is being used by the host computer, the desired data will be obtained from the back-up SRAM means in response to the enable/2, read/write-2, and direction signals.

3. The apparatus in accordance with claim 1, wherein the data of said object system address but transferred to said host computer data bus being content of the register of the object system.

4. Apparatus for debugging an object system using a host computer including a debugging program and at least a control instruction, said object system including a processing unit, comprising:
  a first bus for connection to said host computer, said first bus including a first data bus and a first address bus;
  a second bus for connection to said object system, said second bus including a second data bus and a second address bus;
  control means for controlling the transfer of information from and to said host computer and said object system;
  port means responsive to said control means for connecting said first data bus and second address bus so to permit transfer of data of said object system over said second address to said host computer;
  a random access memory (RAM), said RAM connected to receive the debugging program and the control instruction sent from the host computer through said first data bus;
  first multiplexer means connected to receive said second address bus and to receive first address bus, said first multiplexer means being responsive to said control means for communicating address information to said RAM; and
  second means connecting said RAM to said host computer and to said object system, said second means being responsive to said control means for communication from said RAM to said object system and for bidirectional communication between said RAM and said host computer; and
  wherein the processing unit of the object system executes the debugging program and control instructions stored in the said RAM.

5. The apparatus of claim 4 wherein said control means comprises a control logic unit for controlling the timing of data and address flows.

6. The apparatus of claim 5 wherein said control logic unit further provides wait state signals to said host computer and to said object system and receives status signal therefrom.

7. The apparatus of claim 5 wherein said object system provides a chip signal and wherein said control means further comprises a port decoder responsive to said chip select signal and providing a latch signal to said port means.

8. The apparatus of claim 4 wherein said second means comprises a first bidirectional buffer means, a second buffer means and a data bus means interconnecting said RAM, first bidirectional buffer means, and second buffer means, said first bidirectional buffer means is connected to said first data bus and is responsive to said control means to enable data flow to and from said host computer; said second buffer means is connected to said second data bus and is responsive to said control means to enable communication to said object system.

9. The apparatus of claim 4 further comprising:
third, bidirectional buffer means connected to said second buffer means over said second data bus;
back-up RAM means said back-up Ram means being addressed by the second address bus and connected to said second data bus through said third bidirectional buffer means for storing the data of said RAM read by the object system in response to the control means; and wherein
when the object system desires to read the data of the RAM during the time interval the RAM is being used by the host computer, the desired data will be obtained from the back-up RAM in response to the control means.

* * * * *